United States Patent [19]
Pruchnik

[11] Patent Number: 4,791,618
[45] Date of Patent: Dec. 13, 1988

[54] WELL LOGGING METHOD AND SYSTEM FOR DETECTING STRUCTURAL AND STRATIGRAPHIC GEOLOGICAL MAKE-UP OF SUBSURFACE FORMATIONS

[75] Inventor: Paul R. Pruchnik, Ridgefield, Conn.

[73] Assignee: Schlumberger Technology Corporation, New York, N.Y.

[21] Appl. No.: 45,211

[22] Filed: Apr. 28, 1987

Related U.S. Application Data

[63] Continuation of Ser. No. 834,940, Feb. 28, 1986, abandoned, which is a continuation of Ser. No. 295,365, Aug. 24, 1981, abandoned.

[51] Int. Cl.$^4$ .............................................. G01V 1/00
[52] U.S. Cl. ...................................... 367/25; 367/28; 367/53; 364/422; 364/513
[58] Field of Search ..................... 346/33 C, 33 WL; 73/151, 151.5, 152, 153; 364/146, 420, 421, 422, 550, 821; 367/13, 25, 35, 53, 59, 60, 61, 62, 63, 64, 65, 66, 67, 68, 69, 70, 71, 73, 86

[56] References Cited

U.S. PATENT DOCUMENTS

| | | | |
|---|---|---|---|
| 3,975,674 | 8/1976 | McEuen | 324/1 |
| 4,236,233 | 11/1980 | Davis, Jr. et al. | 367/71 |
| 4,276,599 | 6/1981 | Timmons et al. | 364/422 |
| 4,293,933 | 10/1981 | Park et al. | 367/73 X |
| 4,313,164 | 1/1982 | Regat | 324/323 X |
| 4,348,748 | 9/1982 | Clavier et al. | 364/422 |
| 4,352,166 | 9/1982 | Schoonover | 367/71 X |
| 4,393,485 | 7/1983 | Redden | 367/25 |
| 4,414,656 | 11/1983 | Hepp | 367/25 |
| 4,531,204 | 7/1985 | Vanderschel | 367/25 |

OTHER PUBLICATIONS

Random House College Dictionary, Unabridged Edition, 1980 p. 226.
Buchanan, Bruce G., "Dendral and Meta-Dendral: Their Applications Dimension", *Artificial Intelligence II* (1978).
Davis, Randall, Buchanan, Bruce and Shortliffe, Edward "Production Rules as a Representation", *Artificial Intelligence* 8.
Duda, R. O., et al., "A Computer-Based Consultant for Mineral Exploration", SRI Report, (Final Report, Sep. 1979).
Fundamentals of Dipmeter Interpretation, 1970; vol. I, Fundamentals, 1981.
Lesser, V. R., et al., "Organization of Hearsay II Speech Understanding System", IEEE Transactions, vol. ASSP-23, No. 1.
Reddy, D. R., Erman, L. D., Fennel, R. D. and Neely, R. B, "The Hearsay Speech Understanding System", Proc. 3rd IJCAI.
Shortliffe, E. H., Computer-Based Medical Consultations; MYCIN, Elsevier, 1976.

*Primary Examiner*—Deborah L. Kyle
*Assistant Examiner*—Brian S. Steinberger
*Attorney, Agent, or Firm*—Cooper & Dunham

[57] ABSTRACT

Disclosed are a well logging process and a well logging system using dipmeter and other logs to find subsurface faults and unconformities and automatically produce therefrom, and with user interaction, a subsurface map of the structural and depositional environment and stratigraphic characteristics of subsurface formations particularly important in the search for and exploitation of subsurface resources such as hydrocarbons.

1 Claim, 2 Drawing Sheets

WELL LOGGING METHOD AND SYSTEM FOR DETECTING STRUCTURAL AND STRATIGRAPHIC GEOLOGICAL MAKE-UP OF SUBSURFACE FORMATIONS

This is a continuation of application Ser. No. 834,940 filed 2-28-86 which in turn is a continuation of application Ser. No. 295,365 filed on 8-24-81 both abandoned.

BACKGROUND AND SUMMARY OF THE INVENTION

The invention is generally in the field of well logging and relates particularly to a machine-implemented process and a system for using dipmeter logs, other logs, and user interaction to detect and map the structural and stratigraphic make-up of relevant parts of subsurface formations which are most likely to be particularly important in the search for and exploitation of underground resources such as hydrocarbons. Examples are subsurface faults and unconformities which are likely to be hydrocarbon traps, and the structural and depositional environment and stratigraphic characteristics thereof, such as, in a particular example, the structural dips immediately above and below a fault, the nature of the fault (e.g., growth fault), the orientation of the fault (e.g., oriented along a line from 60° to 240°, with the downthrown block at 150°), and the stratigraphy (e.g., a distributary-front with an associated channel having channel access at 160° in which the flow was at 75°).

Characteristics of prehistoric beaches, deltas, faults and other subsurface formations can serve as important guides in the search for and exploitation of underground resources such as hydrocarbons, but of course cannot be observed directly in the typical case. Accordingly, their presence and characteristics must typically be found from various indirect measurements, such as those produced by logging a borehole traversing the formations. One of the important logging tools is the dipmeter, which produces dipmeter logs allowing for mapping the dip (i.e., the three-dimensional orientation or attitude) of subsurface formations. Other logging tools produce logs of subsurface characteristics such as electrical resistivity and conductivity, spontaneous electrical potential, nuclear activity and characteristics, and yet other logs are derived in a more indirect manner and comprise measurements versus depth in the borehole of subsurface parameters such as porosity. Such logs can be recorded on a record medium such as film or paper as traces showing the magnitude of the logged parameter versus depth in the borehole. Some, such as the dipmeter logs, can be converted to other presentations, such as an arrowplot or tadpole log comprising a vertical arrangement of arrows, where the vertical position of an arrow corresponds to depth in the borehole, the horizontal position is indicative of dip magnitude and the direction of the arrow is indicative of dip azimuth.

Well logs derived for the same subsurface formations, for example from the same borehole, can be examined by expert log interpreters to seek clues to subsurface formations which are likely to serve as traps for hydrocarbons and to the nature of such formations. A difficulty with such subjective interpretation is that few experts can consistently arrive at accurate conclusions, and that such process is excessively time consuming and prone to error. Accordingly, work has been done in the past toward seeking to find an accurate and consistent way of utilizing well logs to find and map the subsurface characteristics considered important in the search for and exploitation of hydrocarbons, and an example is disclosed in U.S. patent application Ser. No. 140,578, now U.S. Pat. No. 4,414,656, filed on Apr. 15, 1980 in the name of Vincent R. Hepp and entitled "Well Logging System for Mapping Structural and Sedimentary Dips of Underground Earth Formations," which is assigned to the assignee of this application and is hereby incorporated in this application by reference as though fully set forth herein. In addition, proposals have been made in fields other than well logging for utilizing some initial measurements or information respecting a system to derive more general conclusions about its nature. For example, Duda, R. et al, "Development of a Computer-Based Consultant for Mineral Exploration," SRI Report, October 1977, propose mapping subsurface formation from seismic measurements; Buchanan, B. G., Feigenbaum, E. A., "Dendral and Melta-Dendral," Art. Intel., 11:5-24, 1978, propose reaching conclusion about mass spectrum from initial measurements; Reddy R. et al, "The HEARSAY Speech Understanding System," Proc. 3rd IJCAI, 185-193 propose chess moves solutions; Lesser, V. R. et al, "Organization of the HEARSAY-II Speech Understanding System," IEEE Trans. ZXXP, 23:11-23, January 1975, propose techniques in speech analysis; and Shortlifle, E. A., "Computer-Based Medical Consultations: Mycin," 1976, proposes a system for assisting medical diagnosis. See also, Davis R., Buchanan, B. G., Shortlifle, E. H., "Production Rules as a Representation," Art. Intel., 8:15-45, 1977. Unlike such prior art systems in fields other than well logging, the well logging environment has both weak a priori constraints on the ultimate results and weak consistency between result components. For example, multiple geological forces can be at work simultaneously or can affect a given formation in different or same ways at different times, and thus well logs tend to reflect the unseparated influence of such multiple forces; the logging process must contend with highly adverse measurement conditions (in a deep borehole typically having uneven walls and filled with high pressure and often high temperature mud); and the presence and nature of a geological feature at a given depth suggests little about the nature of formations spaced therefrom. Accordingly, in well logging subjective interpretation rather than automated systems have been the known way of utilizing primary and processed logs for finding the subsurface features of greatest interest, such as hydrocarbon traps, as discussed for example in "Fundamentals of Dipmeter Interpretation," 1970, and "Dipmeter Interpretation,", Vol. 1, Fundamentals, 1981, published by the assignee of this application and collectively referred to hereafter as the "dipmeter fundamentals books".

In contrast to having to rely solely on human interpretation of well logs, but while utilizing empirical knowledge developed through such log interpretation, the invention makes it possible for a machine to use the logs to reach the ultimate results considered important in searching for and exploiting subsurface hydrocarbon traps, and to utilize such results to generate subsurface maps of the features of greatest interest in such search and exploitation. In an exemplary embodiment, the invented system comprises a log storage which stores the dipmeter and other logs used in practicing the invention, a blackboard storage which stores the current state of interpretation developed as a result of the invented process as well as the history thereof, an inference engine which responds to the logs and/or patterns in the blackboard storage by changing the state of interpretation therein, and an user-interface terminal. The terminal has a changing display of the most relevant logs and state of interpretation parameters, and inputs by which a user can actively participate in the developing interpretation and mapping of the relevant subsurface formations.

In a particular example the log storage stores the dipmeter and borehole deviation logs and other logs such as the caliper and porosity (e.g., sonic and density) logs and possibly lithology and resistivity logs. The display at the user terminal shows: a small section, e.g. 200 feet, of a selected log, such as the caliper log; the dipmeter log, in the form of an arrowplot, for the same 200 foot section of the borehole; the borehole deviation log for the same 200 foot borehole section; a compressed dipmeter log, in the form of an abbreviated arrowplot showing depth and dip magnitude but not azimuth for the entire borehole interval which has been logged or is of interest, with an indication thereof for the 200 foot section displayed in detail; and other parameters such as a list of types of subsurface formations (e.g., patterns, lithologies, faults, zones, etc.), attributes (e.g., top and bottom borehole depth levels of a particular formation and its nature, or the attributes of a fault such as strike), and a menu of possible user selections. As an initial step, the system makes a first pass through the logs in the log storage to find any depth zones of doubtful quality due to, for example, malfunction of the log tool, logging operator errors, or log portions missing for other reasons. Unless a user selects a depth zone of special interest, the system then treats the logs to find the likely structural dip of subsurface formations. A premise is that small scale processes (river flow, tidal action at shorelines, etc.) produce characteristically varying patterns which typically extend over, say, 10 to 100 feet, while large scale processes (uplift or subsidence of a whole region) contribute additional, relatively constant dip, that extends, say, 500 to 1,000 or more feet. This additional and relatively constant dip is referred to as structural dip and typically results from tectonic as opposed to depositional or erosional events. Structural dip is important for at least two reasons in this invention: it is the overall orientation of large collections of subsurface layers and this in turn is suggestive of the likely direction of flow of hydrocarbons, which tend to float up through porous materials; and the structural dip is a background signal which can be removed from the overall dip of sedimentary layers to assist in the correct interpretation of small scale or stratigraphic events. Discontinuities of certain types in structural dip are indicative of missing sections, which can be faults or unconformities. A fault can be generally defined as a subsurface fracture with subsequent movement of the two blocks relative to each other, and is characterized by a number of attributes, such as the relative movement of both blocks with regard to the vertical and with respect to the dip of the fault plane, by the magnitude of dip of the fault plane, by the time of occurrence with respect to deposition, by the process which caused the fault, by relation to adjacent bedding, etc. An unconformity can be generally defined as the result of a hiatus or significant change in the normal geological sequence caused, for example, by a break in the process of deposition or erosion, or by structural deformation. It generally results in a missing amount of sediments corresponding to a missing geological time as compared to the normal sequence and is generally made up of two different series of strata separated by a surface of unconformity. An unconformity can similarly be characterized by a number of attributes, such as by type (e.g., nonconformity, paraunconformity, disconformity and angular unconformity), lateral extent, missing geological time, etc.

Particularly in the missing sections which could be of interest because they could serve as potential traps for hydrocarbons, it is important to know the depositional environment and the stratigraphy of the subsurface formations and, accordingly, the system utilizes the current state of interpretation (structural dips, faults and unconformities and their attributes) and logs such as, for example, resistivity and lithology, to find the relevant depositional environment (e.g., whether the particular subsurface formation of interest was formed in a marine environment and if so, how deep the water was) and stratigraphy (e.g., the shape of the layer and its orientation and flow direction).

Throughout the process the most relevant aspects of the current state of interpretation contained in the blackboard storage are displayed to the user, and the user can accept, modify or reject intermediate or final interpretation results in the blackboard storage or supply that storage with additional characteristics of the subsurface formations which may be the result of, for example, general and subjective knowledge about the formations of interest. For example, through the interface terminal which displays the intermediate results of finding zones of doubtful validity, the user can accept, modify or reject the relevant automatically derived intermediate results so that the current state of interpretation stored in the blackboard will thereafter incorporate any modifications so made by the user and such modifications can become the basis for later-derived intermediate or final results. Similarly, the structural dip automatically found by the system can be accepted, modified or rejected by the user through the interface terminal, with similar consequences, and the same applies to any other intermediate or even final result automatically derived by the system. As an end result, the system can produce tangible representations of the final state of interpretation contained in the blackboard storage, for example in the form of a map and/or other showing of the relevant part or parts of the subsurface formations, together with any desired intermediate results of the process and characteristics of the nature of the subsurface feature(s) of interest, the likely geological history thereof and possible other relevant attributes thereof.

DETAILED DESCRIPTION

Figure 1:
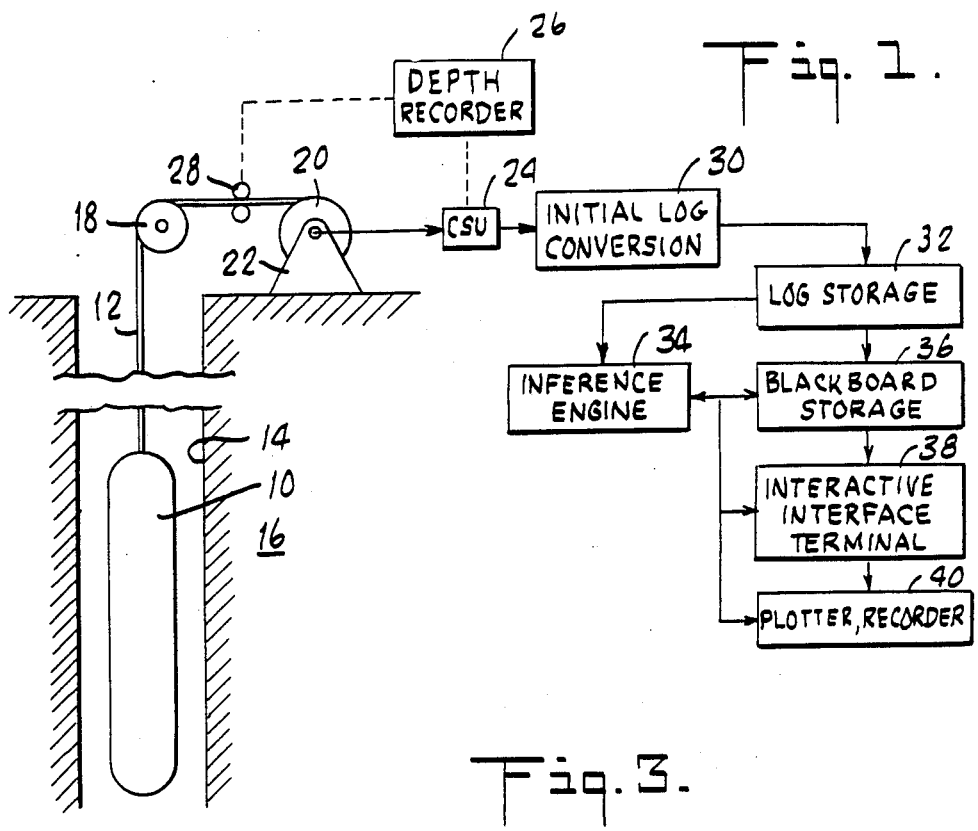
FIG. 1 is a generalized schematic illustration of a system utilizing the invention.

Referring to FIG. 1 for an overall illustration of a system making use of the invention, a well logging tool schematically illustrated at 10 is suspended on a cable 12 in a borehole 14 for investigating subsurface earth formations 16. Tool 10 can be a dipmeter tool which has four caliper arms actuated hydraulically from the surface to press respective measuring devices against the walls of borehole 14 so as to derive conductivity logs as the tool moves up the borehole. In addition, the dipmeter tool can include a device for measuring the instantaneous orientation of the tool with respect to magnetic north as well as the inclination of the tool axis from the vertical, and a device for measuring the instantaneous degree of extention of the arms and thereby the borehole caliper, so as to derive a caliper log. In the alternative, tool 10 can be another type of tool, deriving other logs such as sonic, density, spontaneous potential, etc. Cable 12, which typically is a multiconductor armored cable, passes over sheave wheel 18 and is secured to a drum-and-winch mechanism 20, which includes a suitable brush-and-slipring arrangement 22 for providing electrical connections between conductors within cable 12 and a unit 24, which is labelled CSU and includes suitable electrical and electronic circuitry for controlling tool 10 and for receiving logging signals therefrom and readying them for later use. A depth recorder 26 receives depth signals from wheel 28 engaging cable 12, and sends to unit 24 signals indicative of the apparent depth in the borehole at which each given log measurement is taken. Unit 24 or tool 10, or another unit (not shown) can include suitable analog-to-digital converters for converting analog signals received from tool 10 to digital measurements each associated with a given depth level in the borehole. The logs initially processed by unit 24 can be subjected to initial log conversions in unit 30, for example for depth alignment of logs or other log corrections. The logs useful in practicing the invention are stored in log storage 32, for example in the form of electrical or magnetic signals stored in, for example, semiconductor memory circuits or magnetic disc or tape storage devices. The logs in storage 32 are utilized by an inference engine 34, which can comprise a specially programmed and arranged digital computer such as the one commercially available under the designation DEC20, and also to a blackboard storage 36, which can comprise storage devices similar to those used in log storage 32. Blackboard storage 36 stores the current state of interpretation of the subsurface formations reflected in the logs in storage 32 as well as the interpretation history, and its contents are expanded and/or modified as the invented process carries out its steps. Inference engine 34 and blackboard storage 36 are interconnected with an interactive user interface terminal 38, which can be a graphics system commercially available under the designation RAMTEK running under a system commercially available under the designation VAX-11/780. Terminal 38 displays the relevant part of the current state of interpretation contained in blackboard storage 36, and has suitable facilities, such as a keyboard and an electronic pointing device and/or a joystick, allowing the user to modify and add to the state of interpretation contained in blackboard storage 36. Units 34 and 38 are further connected to a device 40, which can comprise a plotter or other equipment for producing visible representations on record medium such as film or paper, of logs and/or subsurface formations maps, and can contain other devices for recording such subsurface characteristics, for example in storage devices similar to those used in unit 22.

Figure 3:
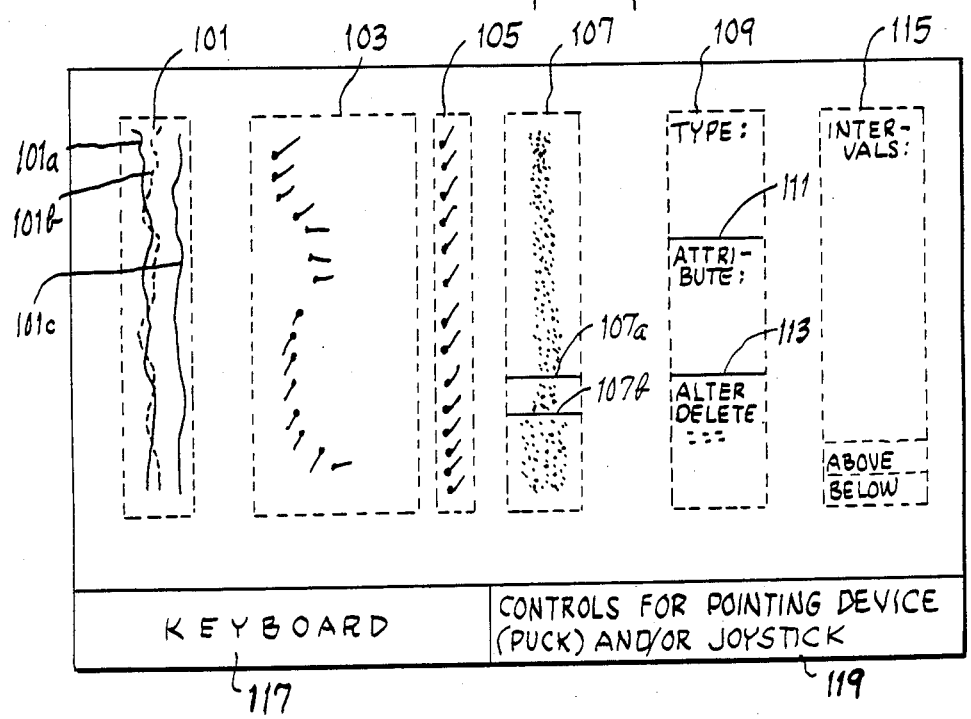
FIG. 3 is a schematic illustration of the display and keyboard and cursor controls of an interface terminal used in practicing the process of FIG. 2.
Figure 2:
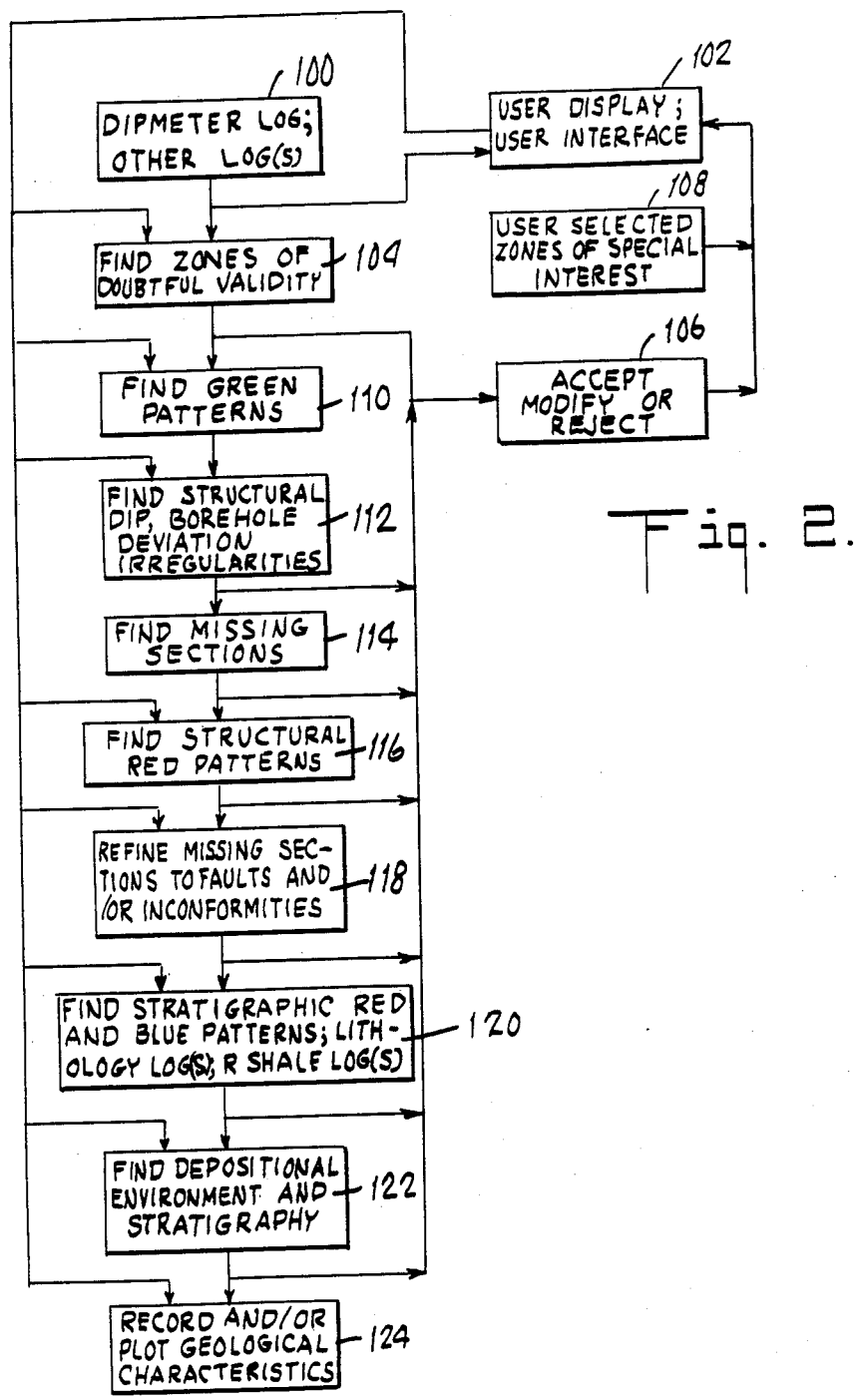
FIG. 2 is a flowchart illustrating main steps in carrying out an exemplary process utilizing the invention.

Major steps in practicing an exemplary embodiment of the invention are illustrated in FIG. 2, where the initial step 100 comprises deriving a dipmeter log and one or more other logs such as a caliper log, a borehole deviation log, a sonic log, an electrical resistivity log, a spontaneous electrical potential log and/or a nuclear activity log. The dipmeter log can comprise the digitized log outputs from a four-pad dipmeter tool producing four traces, each for a respective path along the borehole wall spaced 90° from the two adjacent paths and each comprising conductivity measurements and their respective depth levels in the borehole, said measurements having been taken every few tenths of an inch (e.g. every 0.2" as the dipmeter tool is slowly drawn up the borehole by cable 12. In the alternative, or in addition, the dipmeter log derived at step 100 can be in arrowplot form or in its equivalent, such arrowplot being derived by processing the four conductivity outputs of the tool pads to produce, for each depth level of interest in the borehole, an arrow (sometimes called a tadpole) indicative of the dip magnitude and dip azimuth of the attitude or orientation relative to the vertical and relative to North, of the earth formation traversed by the borehole at the depth level of the given arrow or tadpole. The dipmeter log and presentations thereof, such as the tadpole plot or arrowhead plot, are discussed in said dipmeter fundamentals books. The other logs can include the caliper log and, for example the sonic and the density logs. Concurrently with the derivation of the desired logs at 100, step 102 displays desired characteristics thereof and allows user selection of the displayed matter. The display format can be as illustrated in FIG. 3, where the lefthand portion generally indicated at 101 displays, at the option of the user, the caliper log for a selected borehole depth interval, for example a 200 foot interval, which has a top and a bottom depth selected by the user, and additionally or instead can display a portion of the sonic and/or density logs for the same 200 foot depth interval. For example, the display can include the sonic log 101a, the density log 101b and the caliper log 101c for the same 200 foot depth interval selected by the user. A central display portion generally designated 103 shows a dipmeter log, in arrowplot form, for the same 200 feet depth interval in the borehole, with an arrow or tadpole every few feet (e.g., 2'), and a display portion 105 to the right thereof shows arrows indicative of borehole deviation. Display section 107 shows the dipmeter arrowplot for the entire borehole, on a compressed vertical scale in which the 200 foot section displayed in detail at 101 and 103 is indicated, in terms of its top and bottom borehole depths, by respective lines 107a and 107b. Display portion 109 is used to display types of subsurface formations or characteristics thereof, display section 111 is used to display attributes of subsurface formations and display section 113 is used to display a menu for user actions, such as altering or deleting a subsurface characteristic. Yet additional subsurface characteristics can be displayed in section 115 through a keyboard schematically illustrated at 117 and electronic pointing device (puck) and/or joystick controls generally designated at 119. The user can move lines 107a and 107b up and down the depth extent of the entire borehole, to thereby display in detail selected 200 foot sections thereof and can interact with the current state of interpretation contained in the blackboard storage.

Referring again to FIG. 2, as a result of the derivation of the desired logs at step 100, the user display can show, at section 107 thereof, the vertically compressed arrowplot form dipmeter log for the entire extent of the borehole, the detailed dipmeter arrowhead plot of a 200 foot borehole depth interval at section 103 and of one or more of the other logs at section 101. The user can select, by controls 119 and/or keyboard 117, the particular 200 foot borehole depth interval to be displayed in detail. At step 104 in FIG. 2, the process checks each of the logs derived at step 100 to find any zones of doubtful validity, such as zones indicative of mechanical malfunction of the dipmeter or other logging tool, operator error, washouts, sparse or blank zones and intervals where the dips are mirror images of the borehole deviation. The results of the tests at step 104 are supplied to the user display, and at step 106 the user can accept, modify or reject such doubtful zones. If the user has a special interest in a given depth interval, a selection of the zone for that interval can be made at step 108, so that only that section of the borehole can be displayed in detail and processed further. At step 110 the process starts testing the dipmeter log to find any green patterns, i.e., substantially depth-contiguous dips whose dip magnitudes and dip azimuths are substantially consistent. The inference engine examines all possible groupings of depth-contiguous dips and finds candidate green pattern for user examination, starting for example at the top of the borehole (or of a zone selected by the user at 108) and proceeding down the borehole. The 200 foot interval under consideration at any one time is shown in detail at 103 on the display, and any green patterns found by the process are identified, for example by coloring green the displayed arrows which form a part of a green pattern. Again, at 106 the user can accept, modify or reject any green pattern which was automatically found at step 110, by use of controls 119 and/or keyboard 117. After user confirmation, combinations of green patterns are agglomerated into structural dip hypothesis, using for example a premise that patterns whose vertical extent is less than a threshold, e.g., 100 feet, are not likely to be indicative of structural dip, but that patterns whose vertical extent is over a given threshold, say 500 feet, are indeed likely to be indicative of structural dip. The structural dip and any borehole deviation irregularities found at 112 are displayed to the user, and again at step 106 the user can accept, modify or reject the parameters found at step 112. Following step 112, and any modification of the results thereof by the user at step 106, step 114 finds likely missing sections by having the inference engine proceed through a hierarchy of geological rules, for example a rule based on the premise that certain types of discontinuities of structural dip between depth successive borehole zones are likely to correspond to a missing section. Again, the results of step 114, which comprise an identification of the top and bottom of a missing section and of the structural dips above and below, are displayed, and the user can accept, modify or reject them at step 106. At step 116 red patterns are found which are characterized by a string of substantially depth-contiguous dips whose dip magnitudes generally increase with depth in the borehole and whose dip azimuths are consistent. For example, structural red patterns can be found at 116 by having the user scroll the display through the relevant depth extent of the borehole and designate groups of dips appearing at section 103 of the display as red patterns. At step 118 the process refines the missing sections found at step 114 (and after any modifications by the user at step 106) by distinguishing between missing sections which are likely to correspond to subsurface faults and missing sections which are likely to correspond to subsurface unconformities, by using at least in some cases, both the missing section attributes found at step 114 and the red and blue pattern attributes found at step 116. Following automatic refining of missing sections at step 118 and display thereof, the user again can accept, modify or reject the automatically found results. At step 120, stratigraphic red and blue patterns are found, each of which comprises substantially depth-contiguous dips whose dip magnitude generally decreases with depth in the borehole and whose dip azimuths are consistent, said blue patterns being selected by a user in a manner similar to that discussed in connection with red patterns regarding step 116. In the same step 120 the user can supply the system with lithological characteristics of the formations which may be known from other logs or other sources and with shale resistivity characteristics of the formation known from respective logs or from other sources, said characteristics being supplied through keyboard 117 and/or cursor controls 119. In the alternative, resistivity (e.g., shale) and lithology logs stored in step 100 can be used for the purpose. Again, any part of the current state of interpretation contents of the blackboard storage can be accepted, modified or rejected by the user through the user interface terminal. At step 122 the system finds, on the basis of the current contents of the blackboard storage, depositional environment and stratigraphy characteristics of the relevant parts of the subsurface formation, for example of the areas of one or more faults and/or unconformities selected by the user and, after any acceptance, modification or rejection by the user at step 106, at step 124 the system records and/or plots the relevant geological characteristics found as discussed above.

In carrying out the processes discussed in connection at least with steps 114, 118, 120 and 122, the inference engine operates on the basis of a heirarchical set of rules whose purpose is to infer the existence of geological structures and features from the presence of various features on logs and/or in the state of interpretation stored in the blackboard storage. A sample rule, expressed in simplified syntax, is "if there is a red pattern above a fault, and the length of the red pattern is greater than 200 feet, then the fault is a growth fault." The premise part of the rule consists of one or more clauses, each of which is composed of a predicate on one or more patterns. A clause can refer to a feature of a log (e.g., red patterns) or geological entities (e.g., faults), and is an assertion or a fact, as for example "there is a red pattern over a fault." Such clauses, expressed in "token" format, are stored in the blackboard storage upon derivation and, as discussed above, can be modified or rejected by the user, through the interface terminal, at any time. The inference engine carries out its operation in accordance with rules such as the sample rule above, by scanning through the tokens which are in the blackboard storage at any one time to find the combination of tokens contained in the premise part of the rule and the relationship therebetween expressed in the rule, and upon finding both produces a new token which is the conclusion part of the rule. In the sample rule above, the inference engine must find in the blackboard storage a token identifying a red pattern which is over a fault, and must find that the length of the same red pattern is greater than 200 feet, whereupon the inference engine creates the new token identifying the fault as a growth fault and stores a token to that effect in the blackboard storage. Conclusions can be represented in the blackboard storage as patterns describing segments of the log. For example, the presence of a fault zone can be represented as (FAULT 13762 13790

GROWTH 63 243 153) which identifies a fault whose top is at borehole depth of 13,762 feet, the bottom is at borehole depth of 13,790 feet, the fault is a growth fault and it is oriented along a line running from 63° to 243° and that the direction of the downthrown block is 153°.

As one example of an end result of the process discussed in connection with FIG. 2, step 124 can produce a tangible record of (i) the structural dip of at two or more subsurface zones, identifying the top and bottom borehole depths of each zone and the structural dip thereof in terms of dip magnitude and dip azimuth; (ii) a fault and the top and bottom borehole depths thereof as well as other attributes of the fault such as its orientation and type; (iii) a distributary-front with an associated channel, giving the top and bottom borehole depths thereof and the orientation of the channel axis and flow direction. This record can be in the form of a map display and/or it can be in the form of another type of plot or record, such as a visible plot or record on a record medium such as paper or film or the equivalent thereof in the form of electrical and/or magnetic signal stored in devices similar to those discussed in connection with unit 32 in FIG. 1, and can reflect the structural dip, of attributes of the fault and of attributes of the distributary-front and its associated channel.

I claim:

1. A well logging process for dipmeter interpretation comprising the following machine-implemented steps:
   deriving formation dips based at least on dipmeter logs produced by at least one dipmeter tool passed through at least one borehole traversing subsurface earth formations;
   providing blackboard storage for said formation dips and for user-selected tokens characterizing subsurface parameters and for relationships between said tokens and for geological rules;
   processing said formation dips and said user-selected tokens characterizing subsurface parameters by an inference engine operating on the basis of said geological rules each of which comprises (i) a premise made up of tokens, each comprising a geological assertion of fact concerning an attribute of at least one of a well log and a subsurface feature, (ii) the relationship between said tokens, and (iii) a geological conclusion to be derived if the tokens in the premise part of a rule and the relationship therebetween are found in the blackboard storage, wherein the geological conclusion derived from one rule becomes a token for use by another rule; and
   producing a visible record of selected geological characteristics of selected subsurface formations based on said geological conclusions reached by the inference engine on the basis of said geological rules.

* * * * *